US012786807B2

(12) United States Patent
Kasi et al.

(10) Patent No.: US 12,786,807 B2
(45) Date of Patent: Nov. 3, 2026

(54) EVOLVED PACKET SYSTEM FALLBACK HANDLING

(71) Applicant: T-MOBILE INNOVATIONS LLC, Overland Park, KS (US)

(72) Inventors: Narayanan Govindan Kasi, Olathe, KS (US); Saravana Kumar Velusamy, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 165 days.

(21) Appl. No.: 18/789,384

(22) Filed: Jul. 30, 2024

(65) Prior Publication Data

US 2026/0040153 A1 Feb. 5, 2026

(51) Int. Cl.
*H04W 36/00* (2009.01)
*H04L 65/1016* (2022.01)

(52) U.S. Cl.
CPC ... *H04W 36/00224* (2023.05); *H04L 65/1016* (2013.01)

(58) Field of Classification Search
CPC ...... H04W 36/00224; H04W 36/00226; H04L 65/1016
See application file for complete search history.

(56) References Cited

U.S. PATENT DOCUMENTS

2021/0007030 A1* 1/2021 Huang ............ H04W 36/00226
2022/0386183 A1* 12/2022 Guo .................... H04L 65/1016

* cited by examiner

*Primary Examiner* — Ayanah S George
(74) *Attorney, Agent, or Firm* — SHOOK, HARDY & BACON L.L.P.

(57) ABSTRACT

Systems and methods are provided for optimizing evolved packet system (EPS) fallback handling in telecommunication networks. The system ensures voice call continuity during transitions from 5G to 4G when data session setup is delayed or fails. It detects EPS fallback at an IP multimedia subsystem (IMS) session management function (SMF), receives a context request from an access and mobility management function (AMF), and sends an IMS context response with an EPS fallback flag. The AMF forwards the request to both IMS and data SMFs, prioritizing the IMS response. If the data response is not received within a set time, the AMF uses the IMS context alone and forwards it to the mobility management entity (MME), which prioritizes IMS setup.

20 Claims, 4 Drawing Sheets

EVOLVED PACKET SYSTEM FALLBACK HANDLING

SUMMARY

The present disclosure is directed, in part, to a method and system for optimizing evolved packet system (EPS) fallback handling in a telecommunication network. This method and system addresses the need for ensuring voice call continuity during network transitions by providing a proactive mechanism for prioritizing IP multimedia subsystem (IMS) and emergency services (SOS) packet data network (PDN) sessions when a user device transitions from a 5G network to a 4G network.

According to various aspects of the technology, the disclosed method introduces a solution to the problem of maintaining voice call continuity during EPS fallback conditions in telecommunication networks. By implementing a mechanism to detect EPS fallback conditions and setting an EPS fallback flag within the IMS session management function (SMF), the invention ensures that the voice call setup is prioritized even if there are delays or failures in setting up the data session. This outcome is achieved by transmitting a context request response with the EPS fallback flag from the IMS SMF to the access and mobility management function (AMF), which then forwards it to the mobility management entity (MME). The MME prioritizes the setup of IMS and SOS PDN sessions based on the flag, allowing the voice call to proceed despite data session delays. By achieving this outcome, the problem of dropped or delayed voice calls during EPS fallback is effectively mitigated, ensuring reliable and continuous voice services.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

DETAILED DESCRIPTION

Figure 1:
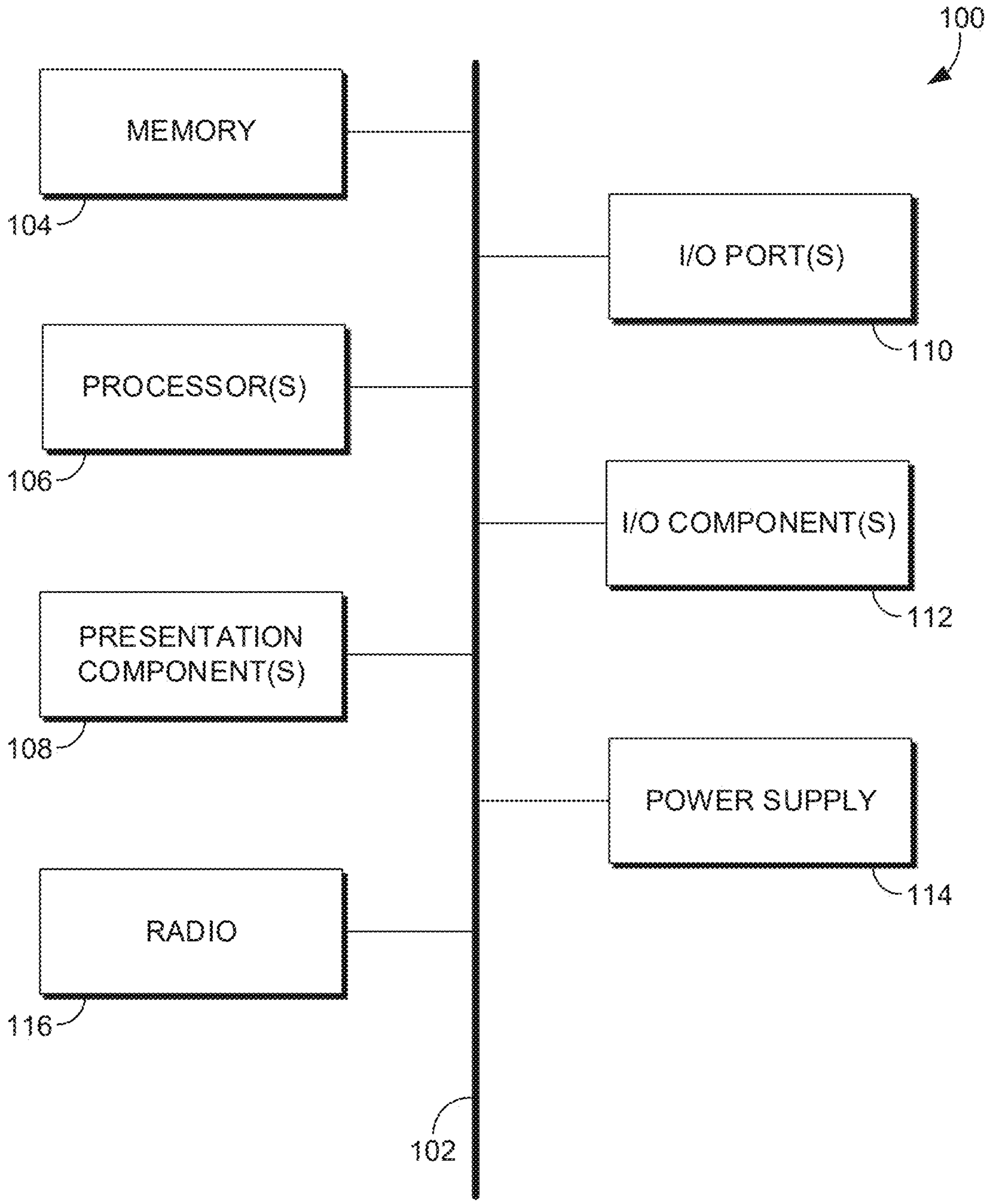
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a particular geographic area. As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like.

Embodiments of the technology described herein can be embodied as, among other things, a method, system, or computer-program product. Accordingly, the embodiments can take the form of a hardware embodiment, or an embodiment combining software and hardware. An embodiment takes the form of a computer-program product that includes computer-useable instructions embodied on one or more computer-readable media that can cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

In modern telecommunication networks, the demand for seamless voice and data services has grown significantly.

With the advent of 5G technology, networks are designed to provide high-speed data transmission and low latency. However, 5G networks often face challenges in supporting traditional voice call services, necessitating a fallback to 4G networks. This process, known as EPS fallback, allows user devices to transition from a 5G network to a 4G network to maintain voice call continuity. Ensuring efficient and reliable EPS fallback is crucial for maintaining service quality and user satisfaction, particularly when transitioning between network types during voice calls.

Conventionally, EPS fallback is managed by detecting the need for fallback and initiating the transition process from 5G to 4G. The standard approach involves the MME sending a context request to the AMF, which then forwards the request to the relevant SMFs for IMS and data services. The IMS SMF and data SMF respond with the necessary context information, which the AMF consolidates and sends back to the MME. The MME then proceeds to establish the voice call and data sessions on the 4G network. However, this conventional method can have significant delays or failures in setting up data sessions, adversely affecting the continuity and quality of voice calls. When delays or failures occur in setting up data sessions, a lack of prioritization for voice call setup during EPS fallback can result in dropped calls or degraded service quality, particularly in scenarios where the data context response is delayed or not received.

Unlike conventional solutions, the present disclosure provides a method for optimizing EPS fallback handling in telecommunication networks, specifically designed to prioritize voice call continuity. The method involves detecting an EPS fallback condition at the IMS SMF when a user device requires a transition from a 5G network to a 4G network. Upon detection, an EPS fallback flag is set within the IMS SMF's context response to indicate the need for prioritization. This flagged response is transmitted to the AMF, which then forwards it to the MME. The AMF reduces the wait time for the data SMF context response based on the presence of the EPS fallback flag, ensuring minimal delay in voice call setup. If the data context response is delayed or fails, the MME proceeds with the voice call setup using the IMS context alone, maintaining service continuity. By prioritizing IMS and SOS PDN sessions and allowing for voice call setup despite data session delays or failures, this method significantly enhances the reliability and quality of voice services during EPS fallback.

Accordingly, a first aspect of the present disclosure provides a system for optimizing EPS fallback handling in a telecommunication network. The system comprises one or more computer processing components configured to perform operations. The operations comprise first detecting, at an IMS SMF, an EPS fallback condition for a user device requiring a transition from a 5G network to a 4G network. The operations next comprise receiving, at the IMS SMF, a context request from an AMF. The operations further comprise, based on the EPS fallback condition, communicating to the AMF an IMS context response, the IMS context response including an EPS fallback flag. The operations additionally comprise the AMF forwarding the IMS context response, including the EPS fallback flag, to a MME. The operations finally comprise the MME prioritizing the setup of IMS and SOS PDN sessions upon receiving the context request response with the EPS fallback flag, and allowing the MME to proceed with the voice call setup even if there is a delay or failure in setting up a data PDN session.

A second aspect of the present disclosure provides a method for ensuring voice call continuity during EPS fallback in a telecommunication network. The method comprises first detecting, at an IMS SMF, an EPS fallback condition for a user device requiring a transition from a 5G network to a 4G network to set up a voice call. The method next comprises receiving, at the IMS SMF, a context request from an AMF. The method further comprises setting an EPS fallback flag in the IMS context response by the IMS SMF. The method additionally comprises transmitting the IMS context request response, including the EPS fallback flag, from the IMS SMF to the AMF. The method further comprises using the AMF to forward the IMS context response, including the EPS fallback flag, to a MME. The method finally comprises the MME prioritizing the setup of IMS and SOS PDN sessions upon receiving the context request response with the EPS fallback flag, and allowing the MME to proceed with the voice call setup even if there is a delay or failure in setting up a data PDN session.

Another aspect of the present disclosure is directed to a non-transitory computer-readable medium having instructions stored thereon that, when executed by one or more computer processing components, cause the one or more computer processing components to perform a method for optimizing EPS fallback handling in a telecommunication network. The method comprises first detecting, at an IMS SMF, an EPS fallback condition for a user device requiring a transition from a 5G network to a 4G network to set up a voice call. The method next comprises receiving, at the IMS SMF, a context request from an AMF. The method further comprises setting an EPS fallback flag in the IMS context response by the IMS SMF. The method additionally comprises transmitting the IMS context request response, including the EPS fallback flag, from the IMS SMF to the AMF. The method further comprises using the AMF to forward the IMS context response, including the EPS fallback flag, to an MME. The method finally comprises the MME prioritizing the setup of IMS and SOS PDN sessions upon receiving the context request response with the EPS fallback flag, and allowing the MME to proceed with the voice call setup even if there is a delay or failure in setting up a data PDN session.

Referring to the drawings in general, and initially to FIG. 1, an exemplary computing environment 100 suitable for practicing embodiments of the present technology is provided. Computing environment 100 is just one example, and is not intended to suggest any limitation as to the scope of use or functionality of the embodiments discussed herein. Furthermore, the computing environment 100 should not be interpreted as having any dependency or requirement relating to any one or a combination of components illustrated. It should be noted that although some components in FIG. 1 are shown in the singular, they can be plural. For example, the computing environment 100 might include multiple processors and/or multiple radios. As shown in FIG. 1, computing environment 100 includes a bus 102 that directly or indirectly couples various components together, including memory 104, processor(s) 106, presentation component(s) 108 (if applicable), radio(s) 116, input/output (I/O) port(s) 110, input/output (I/O) component(s) 112, and power supply 114. More or fewer components are possible and contemplated, including in consolidated or distributed form.

Memory 104 can take the form of memory components described herein. Thus, further elaboration will not be provided here, but it should be noted that memory 104 can include any type of tangible medium that is capable of storing information, such as a database. A database can be any collection of records, data, and/or information. In one embodiment, memory 104 can include a set of embodied computer-executable instructions that, when executed, facilitate various functions or elements disclosed herein.

These embodied instructions will variously be referred to as "instructions" or an "application" for short. Processor 106 can actually be multiple processors that receive instructions and process them accordingly. Presentation component 108 can include a display, a speaker, and/or other components that can present information (e.g., a display, a screen, a lamp (LED), a graphical user interface (GUI), and/or even lighted keyboards) through visual, auditory, and/or other tactile cues.

Radio 116 can facilitate communication with a network, and can additionally or alternatively facilitate other types of wireless communications, such as Wi-Fi, WiMAX, LTE, and/or other VoIP communications. In various embodiments, the radio 116 can be configured to support multiple technologies, and/or multiple radios can be configured and utilized to support multiple technologies. The input/output (I/O) ports 110 can take a variety of forms. Exemplary I/O ports can include a USB jack, a stereo jack, an infrared port, a firewire port, other proprietary communications ports, and the like. Input/output (I/O) components 112 can comprise keyboards, microphones, speakers, touchscreens, and/or any other item usable to directly or indirectly input data into the computing environment 100. Power supply 114 can include batteries, fuel cells, and/or any other component that can act as a power source to supply power to the computing environment 100 or to other network components, including through one or more electrical connections or couplings. Power supply 114 can be configured to selectively supply power to different components independently and/or concurrently.

Figure 2:
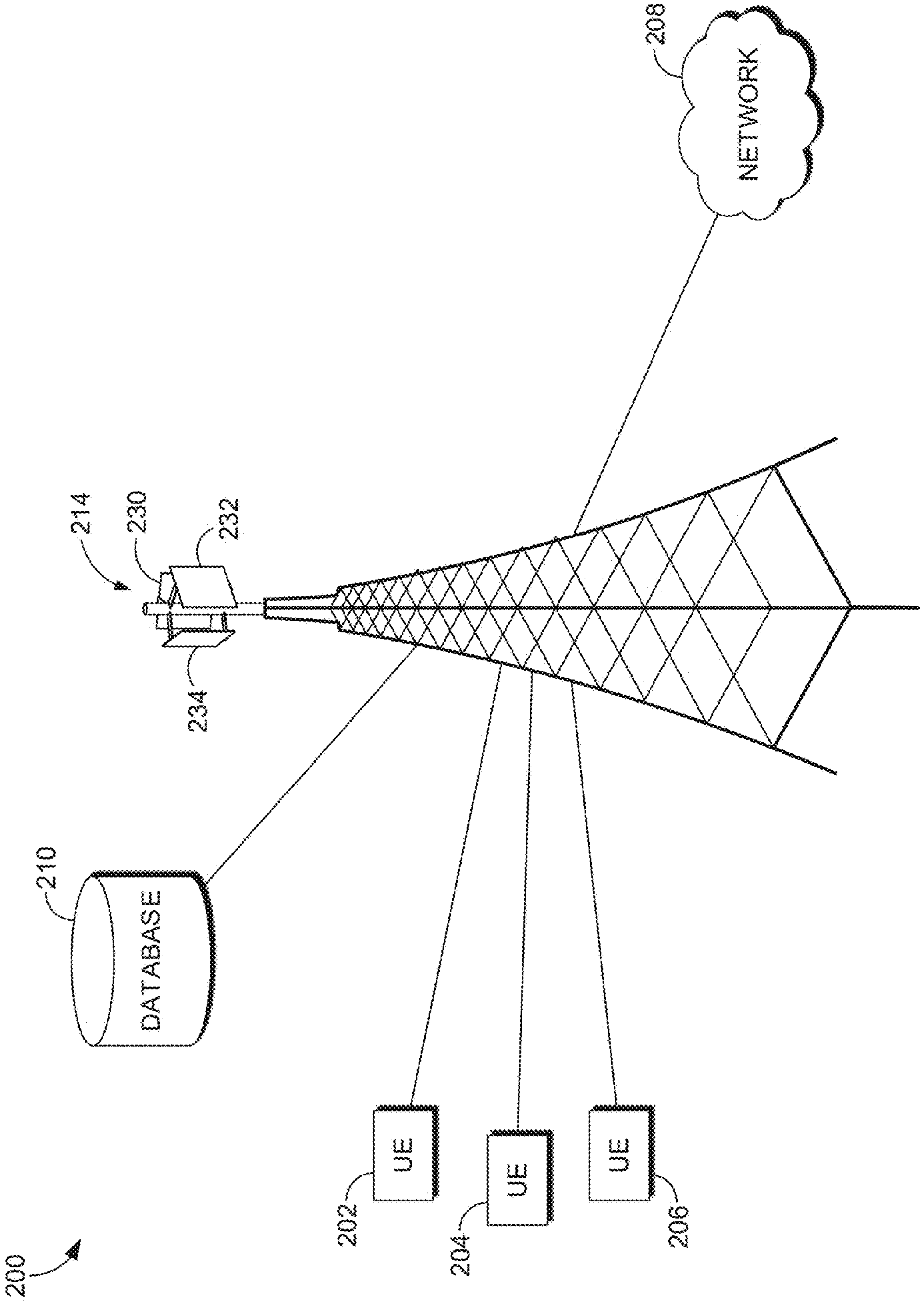
FIG. 2 illustrates a diagram of an exemplary network environment in which implementations of the present disclosure can be employed.

FIG. 2 provides an exemplary network environment in which implementations of the present disclosure can be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes one or more user devices (e.g., user devices 202, 204, and 206), cell site 214, network 208, database 210, and dynamic mitigation engine 212. In network environment 200, user devices can take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with a public or private network.

In some aspects, the user devices 202, 204, and 206 correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, the user devices 202, 204, and 206 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, 6G, CDMA, or any other type of network.

Additionally, device 206 can be any device characterized by high data throughput needs, such as advanced gaming consoles that require rapid data exchange for real-time multiplayer experiences, or professional-grade video conferencing systems used in businesses for high-quality virtual meetings. This category also includes emerging Internet of Things (IoT) devices, like intelligent security cameras and smart home appliances, which constantly transmit and receive data for automation and monitoring purposes. Furthermore, high-performance tablets and laptops, also fall under this category, as they require high-speed internet for cloud computing and large file transfers.

In some cases, the user devices 202, 204, and 206 in network environment 200 can optionally utilize network 208 to communicate with other computing devices (e.g., a mobile device(s), a server(s), a personal computer(s), etc.) through cell site 214. The network 208 can be a telecommunications network(s), or a portion thereof. A telecommunications network might include an array of devices or components (e.g., one or more base stations), some of which are not shown. Those devices or components can form network environments similar to what is shown in FIG. 2, and can also perform methods in accordance with the present disclosure. Components such as terminals, links, and nodes (as well as other components) can provide connectivity in various implementations. Network 208 can include multiple networks, as well as being a network of networks, but is shown in more simple form to not obscure other aspects of the present disclosure.

Network 208 can be part of a telecommunication network that connects subscribers to their service provider. In aspects, the service provider can be a telecommunications service provider, an internet service provider, or any other similar service provider that provides at least one of voice telecommunications and data services to any or all of the user devices 202, 204, and 206. For example, network 208 can be associated with a telecommunications provider that provides services (e.g., LTE, 4G, 5G, 6G) to the user devices 202, 204, and 206. Additionally or alternatively, network 208 can provide voice, SMS, and/or data services to user devices or corresponding users that are registered or subscribed to utilize the services provided by a telecommunications provider. Network 208 can comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), a 5G network, or a 6G network. The network 208 can also be, in whole or in part, or have characteristics of, a self-optimizing network.

In some implementations, cell site 214 is configured to communicate with the user devices 202, 204, and 206 that are located within the geographical area defined by a transmission range and/or receiving range of the radio antennas of cell site 214. The geographical area can be referred to as the "coverage area" of the cell site or simply the "cell," as used interchangeably hereinafter. Cell site 214 can include one or more base stations, base transmitter stations, radios, antennas, antenna arrays, power amplifiers, transmitters/receivers, digital signal processors, control electronics, GPS equipment, and the like. In particular, cell site 214 can be configured to wirelessly communicate with devices within a defined and limited coverage area. In an exemplary aspect, the cell site 214 comprises a base station that serves at least one sector of the cell associated with the cell site 214, and at least one transmit antenna for propagating a signal from the base station to one or more of the user devices 202, 204, and 206. In other aspects, the cell site 214 can comprise multiple base stations and/or multiple transmit antennas for each of the one or more base stations, any one or more of which can serve at least a portion of the cell. For example, the cell site can comprise a first antenna array 230, a second antenna array 232, and a third antenna array 234, wherein each of the antenna arrays serves a distinct sector (i.e., portion) of the coverage area of the cell 214. In some aspects, the cell site 214 can comprise one or more macro cells (providing wireless coverage for users within a large geographic area) or it can be a small cell (providing wireless coverage for users within a small geographic area).

Figure 3:
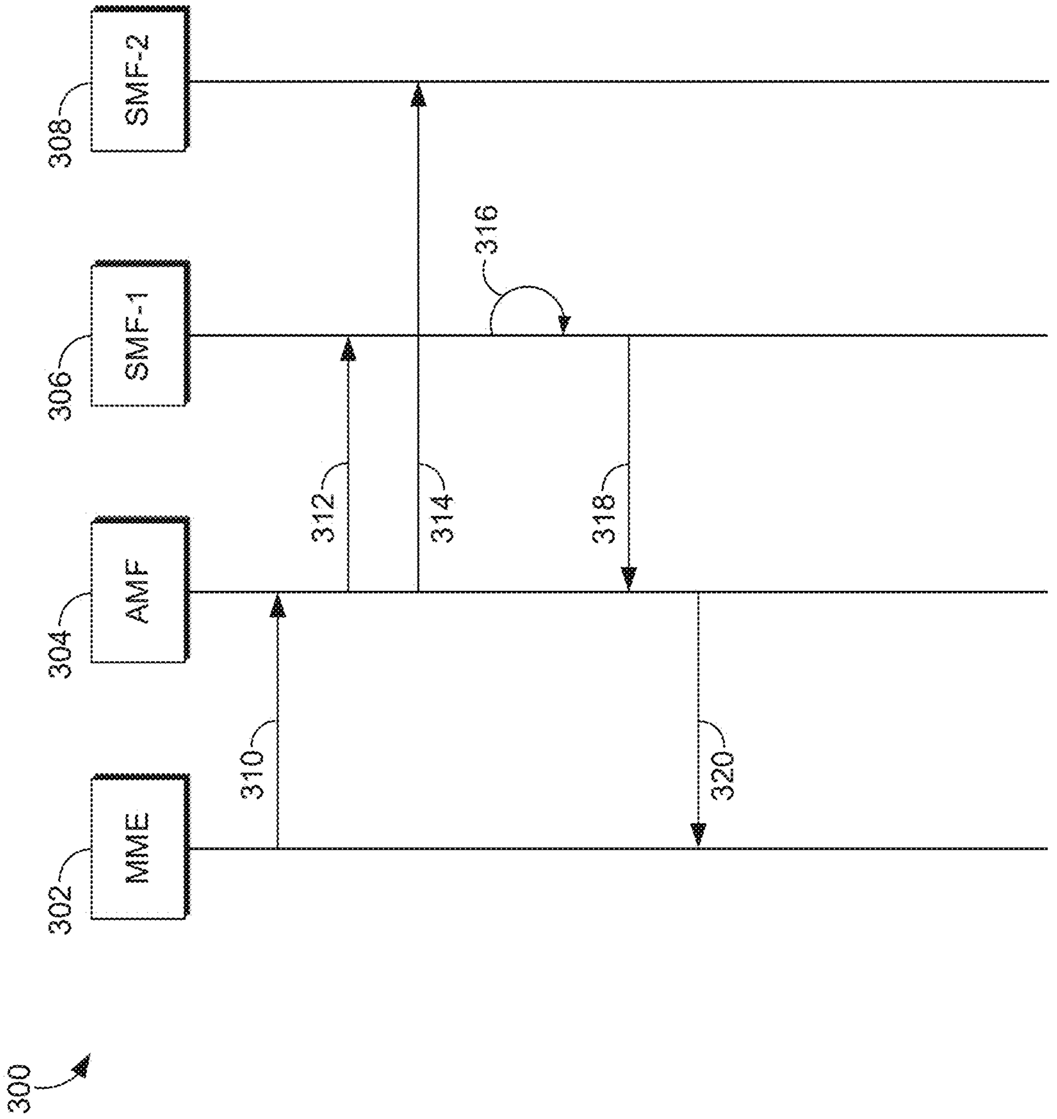
FIG. 3 illustrates an exemplary call flow in which implementations of the present disclosure can be employed.

FIG. 3 illustrates a call flow diagram for managing EPS fallback in a telecommunication network and component such as the network and components described with respect to FIG. 2. The telecommunications network and components involved in the call flow diagram 300 involves a MME 302, AMF 304, IMS SMF-1 306, and data SMF-2 308. This process ensures voice call continuity during the EPS fallback condition, even when the data session setup is delayed or fails.

The process begins at step 310, where the MME 302 initiates a context request for a user device. This context request is crucial for obtaining the session management context required for the device, particularly in scenarios involving EPS fallback. The context request includes vital information such as the user device's current session data, signaling requirements, and network capabilities. The SMF is aware that the device is going to perform EPS fallback (EPSFB) before the context request from MME to AMF. Upon receiving the context request from the MME 302, at step 312, the AMF 304 retrieves the session management context from the SMF. The IMS SMF 306, responsible for handling IMS services, can set the flag for EPSFB towards AMF so that it can be proxied to MME on the context response. This step ensures that the necessary IMS context for voice call setup, including parameters for quality of service (QoS) and session continuity, is retrieved. Simultaneously, at step 314, the AMF 304 also forwards the context request to the data SMF-2 308, responsible for managing data sessions. This parallel forwarding is designed to ensure that both IMS and data contexts are requested and processed concurrently, thereby reducing latency and ensuring a seamless transition for the user device.

At step 316, the IMS SMF-1 306 processes the context request and determines that the user device is in an EPS fallback condition, which necessitates a transition from a 5G network to a 4G network to support voice calls. This determination involves evaluating the current network conditions, device capabilities, and service requirements. Upon detecting the EPS fallback condition, SMF-1 tags the response to the context request with an EPS fallback (EPSFB) flag. This flag serves as an indicator that prioritization for voice call setup is required due to the fallback scenario. The flag is included in the context response to ensure that subsequent network functions recognize the need to expedite the voice call setup process. Following this, at step 318, SMF-1 306 sends the context request response, now tagged with the EPSFB flag, back to the AMF 304. This response includes the necessary IMS context information, such as session identifiers, QoS parameters, and any relevant session continuity data, ensuring that the voice call setup can proceed smoothly.

Upon receiving the IMS context response with the EPSFB flag, the AMF 304 recognizes the need for prioritization and waits for a predetermined period for the data context response from SMF-2 308, as shown in step 320. This waiting period is configurable and is set to ensure that the voice call setup is not delayed while allowing time for the data context to be received. If the AMF 304 does not receive the data context response from SMF-2 308 within the predetermined time, it decides to proceed with the voice call setup using only the IMS context received from SMF-1 306, based on the EPSFB flag presence. Furthermore, the AMF 304 logs the failure to receive the data context response and, if the data context response is not received after multiple attempts, sends an alert to the network management system to notify of the repeated failures. This alert mechanism ensures that network operators are informed of potential issues with the data SMF, allowing for timely investigation and resolution.

At step 320, the AMF 304 forwards the IMS context response after the predetermined time, including the EPSFB flag, to the MME 302. This step ensures that the MME is fully informed of the EPS fallback condition and the need to prioritize the voice call setup. The IMS context response includes all the necessary information for the MME to proceed with establishing the voice call, including session identifiers, QoS parameters, and any flags indicating prioritization requirements. Upon receiving the context response with the EPSFB flag, the MME 302 prioritizes the voice call setup. The MME proceeds with establishing the voice call for the user device, ensuring continuity even if the data session setup is delayed or fails. The MME has the capability to mark the data session context as inactive if the response is not received within a specified period and notify the user device to reattempt the data session setup if needed. This approach ensures that the primary objective of maintaining voice call continuity is achieved, even under suboptimal network conditions.

Figure 4:
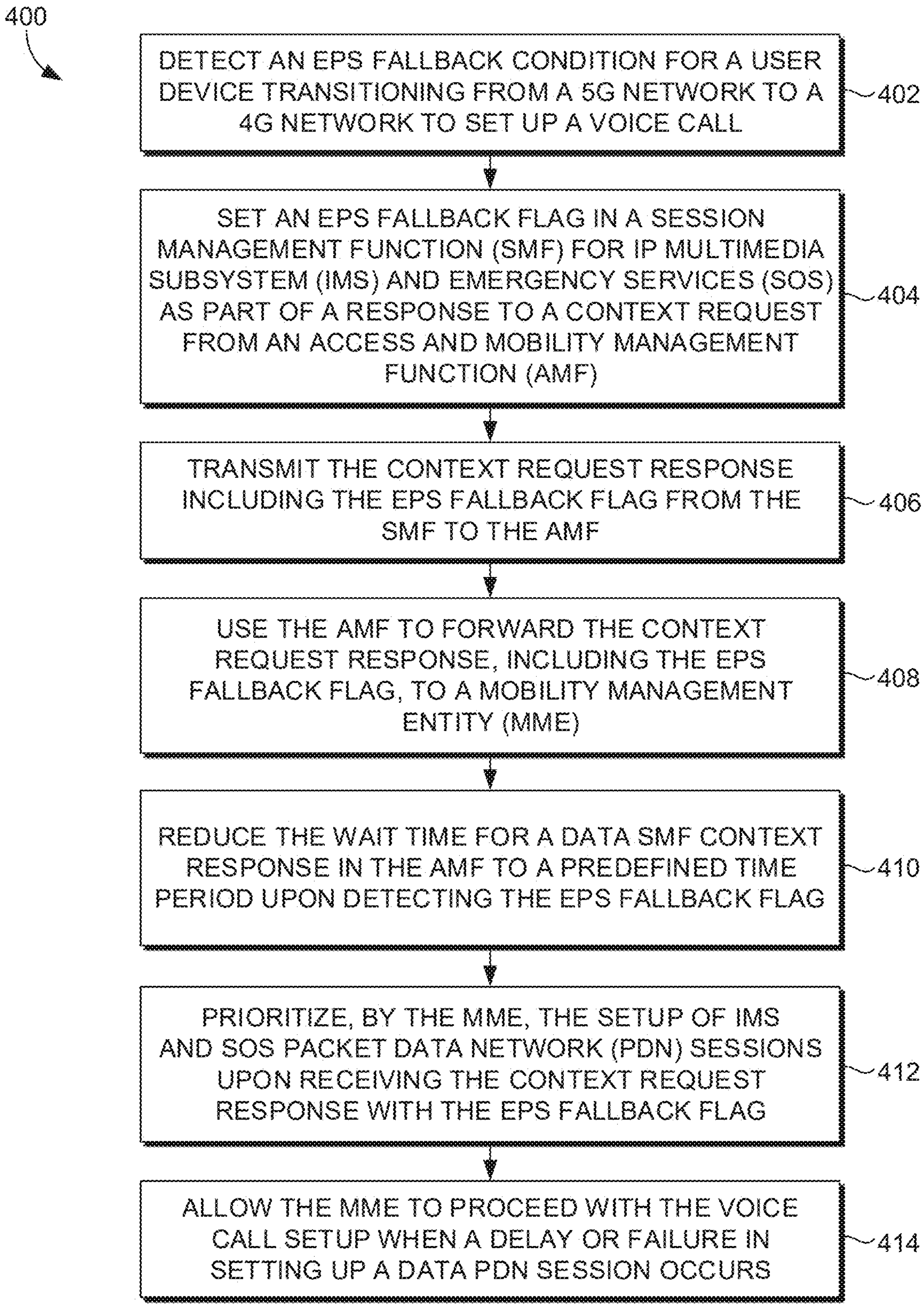
FIG. 4 illustrates a flow diagram of an exemplary method for managing EPS fallback in which implementations of the present disclosure can be employed.

Turning now to FIG. 4, a flow chart is provided that illustrates one or more aspects of the present disclosure relating to a method 400 for self-invalidation of a SIM in a mobile communication device. The method begins with step 402, where an EPS fallback condition is detected for a user device that needs to transition from a 5G network to a 4G network to set up a voice call. This detection occurs within the SMF, which identifies that the current 5G network does not support the required voice call service, thus necessitating a fallback to the 4G network.

In step 404, upon detecting the EPS fallback condition, the SMF sets an EPS fallback flag for IMS and SOS within its context. This flag indicates that the user device requires the transition to maintain the voice call setup and is included in the response to a context request received from the AMF. Following this, in step 406, the SMF transmits the context request response, including the EPS fallback flag, back to the AMF. This response provides the necessary IMS context for the voice call setup and informs the AMF of the fallback condition.

At step 408, the AMF, upon receiving the context request response with the EPS fallback flag, forwards this response to the MME. This step ensures that the MME is aware of the EPS fallback condition and the need to prioritize the voice call setup. In step 410, the AMF reduces the wait time for the data SMF context response to a predefined time upon detecting the EPS fallback flag. This reduction in wait time is crucial to ensure that the voice call setup is not unduly delayed, even if the data session setup response is delayed or not received.

In step 412, the MME, upon receiving the context request response with the EPS fallback flag, prioritizes the setup of IMS and SOS PDN sessions. This prioritization ensures that the voice call and emergency services are established promptly, maintaining service continuity for the user. Finally, in step 414, if there is a delay or failure in setting up the data PDN session, the MME proceeds with the voice call setup. This step ensures that the voice call is maintained even in the absence of a complete data session setup, thereby enhancing the reliability and quality of the voice service.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and can be employed without reference to other features and subcombinations and are contemplated within the scope of the claims.

In the preceding detailed description, reference is made to the accompanying drawings that form a part hereof wherein like numerals designate like parts throughout, and in which is shown, by way of illustration, embodiments that can be practiced. It is to be understood that other embodiments can be utilized and structural or logical changes can be made without departing from the scope of the present disclosure. Therefore, the preceding detailed description is not to be taken in the limiting sense, and the scope of embodiments is defined by the appended claims and their equivalents.

What is claimed is:

1. A method for ensuring voice call continuity during evolved packet system (EPS) fallback in a telecommunication network, the method comprising:

receiving, at an access mobility management function (AMF), a context request from a mobility management entity (MME) for a user device;

forwarding the context request to an IP multimedia subsystem (IMS) session management function (SMF) and a data SMF;

receiving an IMS context request response from the IMS SMF, the IMS context request response including an evolved packet system fallback (EPSFB) flag;

determining, after a pre-determined period of time, that a data context request response has not been received from the data SMF; and forwarding the IMS context request response to the MME.

2. The method of claim 1, further comprising reducing the pre-determined period of time for waiting for the data context request response when the EPSFB flag is included in the IMS context request response.

3. The method of claim 1, further comprising notifying the MME that the IMS context request response includes the EPSFB flag.

4. The method of claim 1, wherein the EPSFB flag indicates that the user device is undergoing an EPS fallback from a 5G network to a 4G network.

5. The method of claim 1, wherein the EPSFB flag includes an indication to prioritize an IMS context over a data context.

6. The method of claim 1, further comprising setting an EPS context status for a data packet data network (PDN) as inactive if the data context request response is not received within the pre-determined period of time.

7. The method of claim 1, further comprising re-attempting to receive the data context request response from the data SMF after forwarding the IMS context request response to the MME.

8. The method of claim 1, further comprising sending an alert to a network management system if the data context request response is not received after multiple attempts.

9. A method for optimizing evolved packet system (EPS) fallback handling in a telecommunication network, the method comprising:

detecting at an IP multimedia subsystem (IMS) session management function (SMF), an EPS fallback condition for a user device;

receiving, at the IMS SMF, a context request from an access and mobility management function (AMF); and based on the EPS fallback condition, communicating to the AMF, an IMS context response, the IMS context response including an EPS fallback flag.

10. The method of claim 9, wherein the EPS fallback condition is detected based on a network-triggered event indicating that the 5G network does not support a required voice call service.

11. The method of claim 9, wherein the EPS fallback condition is detected when the user device initiates a voice call while connected to the 5G network.

12. The method of claim 9, wherein the AMF reduces a wait time for a data context request response upon detecting the EPSFB flag in the IMS context response.

13. The method of claim 9, further comprising forwarding the IMS context response including the EPSFB flag from the AMF to an MME.

14. The method of claim 9, wherein the AMF sets a pre-determined period of time for waiting for a data context request response upon detecting the EPS fallback flag in the IMS context response.

15. The method of claim 14, wherein the pre-determined period of time for waiting for the data context request response is configurable by a network operator.

16. A system for optimizing EPS fallback handling in a telecommunication network, comprising:

an IP multimedia subsystem (IMS) session management function (SMF) configured to:

detect an EPS fallback condition for a user device requiring a transition from a 5G network to a 4G network;

receive a context request from an access and mobility management function (AMF); and communicate an IMS context response to the AMF, the IMS context response including an evolved packet system fall back (EPSFB) flag;

the AMF configured to:

forward the context request to the IMS SMF and a data SMF;

receive the IMS context response from the IMS SMF;

determine, after a pre-determined period of time, that a data context request response has not been received from the data SMF; and after the period of time, forward the IMS context response, including the EPSFB flag, to a mobility management entity (MME).

17. The system of claim 16, wherein the IMS SMF detects the EPS fallback condition based on an initiation of a voice call by the user device while connected to the 5G network.

18. The system of claim 16, wherein the AMF reduces a wait time for the data context request response upon detecting the EPSFB flag in the IMS context response.

19. The system of claim 16, further comprising the AMF notifying the user device of the EPS fallback.

20. The system of claim 16, wherein the AMF sets a EPS bearer context status for a data packet data network (PDN) as inactive if the data context request response is not received within the pre-determined period of time.

* * * * *